(12) United States Patent
Licht et al.

(10) Patent No.: US 10,915,974 B2
(45) Date of Patent: Feb. 9, 2021

(54) METHOD FOR INTEGRATION PROCESSING OF REAL-TIME INFORMATION

(71) Applicant: NCR Corporation, Duluth, GA (US)

(72) Inventors: Yehoshua Zvi Licht, Alpharetta, GA (US); Joseph Arnold White, Encinitas, CA (US); Brent Vance Zucker, Roswell, GA (US)

(73) Assignee: NCR Corporation, Atlanta, GA (US)

( * ) Notice: Subject to any disclaimer, the term of this patent is extended or adjusted under 35 U.S.C. 154(b) by 497 days.

(21) Appl. No.: 15/471,548

(22) Filed: Mar. 28, 2017

(65) Prior Publication Data
US 2018/0204291 A1 Jul. 19, 2018

Related U.S. Application Data

(60) Provisional application No. 62/446,647, filed on Jan. 16, 2017.

(51) Int. Cl.
*G06Q 30/00* (2012.01)
*G06Q 50/00* (2012.01)
*G06Q 30/06* (2012.01)

(52) U.S. Cl.
CPC ......... *G06Q 50/01* (2013.01); *G06Q 30/0631* (2013.01); *G06Q 30/0641* (2013.01); *G06Q 30/0643* (2013.01)

(58) Field of Classification Search
CPC . G06Q 30/0601–0645; G06Q 30/0631; G06Q 50/01; G06Q 30/0641; G06Q 30/0643

USPC ............. 705/26.1–27.2, 26.7, 319, 27.1
See application file for complete search history.

(56) References Cited

U.S. PATENT DOCUMENTS

| | | | |
|---|---|---|---|
| 2012/0084292 A1* | 4/2012 | Liang | G06F 16/2228 707/741 |
| 2014/0244742 A1* | 8/2014 | Yu | H04W 4/21 709/204 |
| 2015/0052189 A1* | 2/2015 | Valvanne | H04L 67/22 709/203 |
| 2016/0142783 A1* | 5/2016 | Bagga | H04N 21/47214 725/47 |

(Continued)

OTHER PUBLICATIONS

Meehan, Kevin; Lunny, Tom; Curran, Kevin; McCaughey, Aiden. Aggregating Social Media Data with Temporal and Environmental Context for Recommendation in a Mobile Tour Guide System. 2016. Journal of Hospitality and Tourism Technology, vol. 7, Issue 3. (Year: 2016).*

*Primary Examiner* — Jeffrey A. Smith
*Assistant Examiner* — Allison G Wood
(74) *Attorney, Agent, or Firm* — Schwegman, Lundberg & Woessner (57) ABSTRACT

A variety of real-time information is collected in real time from a plurality of sources/systems. A current real-time context for activity of a consumer is noted. The real-time information is integrated within the current real-time context and activity of the consumer. In an embodiment, the collected real-time information is crowdsourced from a variety of social media platforms. In an embodiment, the real-time information is integrated as a recommendation made to the consumer for a good or service.

12 Claims, 5 Drawing Sheets

(56) References Cited

U.S. PATENT DOCUMENTS

2016/0379468 A1* 12/2016 Wu .................. G08B 21/24
                                              340/632
2018/0032997 A1*  2/2018 Gordon ............ G06Q 30/0269

* cited by examiner

METHOD FOR INTEGRATION PROCESSING OF REAL-TIME INFORMATION

RELATED APPLICATIONS

This application claims priority to U.S. Provisional Application Ser. No. 62/446,647 entitled: "Methods and Systems for Delivering Real Time Events Fusion Data to Frontend Clients," filed on Jan. 16, 2017; the disclosure of which is incorporated by reference herein in its entirety.

BACKGROUND

Today, frontend systems collect real-time data from generally one backend system. However, collecting data from one backend system may only give the perspective of one data source. In order to deliver a variety of real-time data to a variety of frontend touchpoints, the data must be coming from more than one real-time backend, such as Application Programming Interfaces (APIs) and/or crowdsourcing from social-media streams (Twitter®, Facebook®, Xbox®, Snapchat®, Instagram®, etc.).

Thus, the conventional approach of relying on one data source gives the frontend user an incomplete view of the data. For example, an API may communicate that a sport's team has won or lost, but the API does not communicate the statistics of the game (who has scored, how many yards or hits were accumulated by a player, etc.).

SUMMARY

In various embodiments, methods and a system for integration processing of real-time information are presented.

According to an embodiment, a method for integration processing of real-time information is provided. Specifically, and in an embodiment, a plurality of real-time information is collected from a plurality of backend systems and at least a portion of the plurality of real-time information is integrated into a current real-time touchpoint of a consumer.

DETAILED DESCRIPTION

Figure 1A:
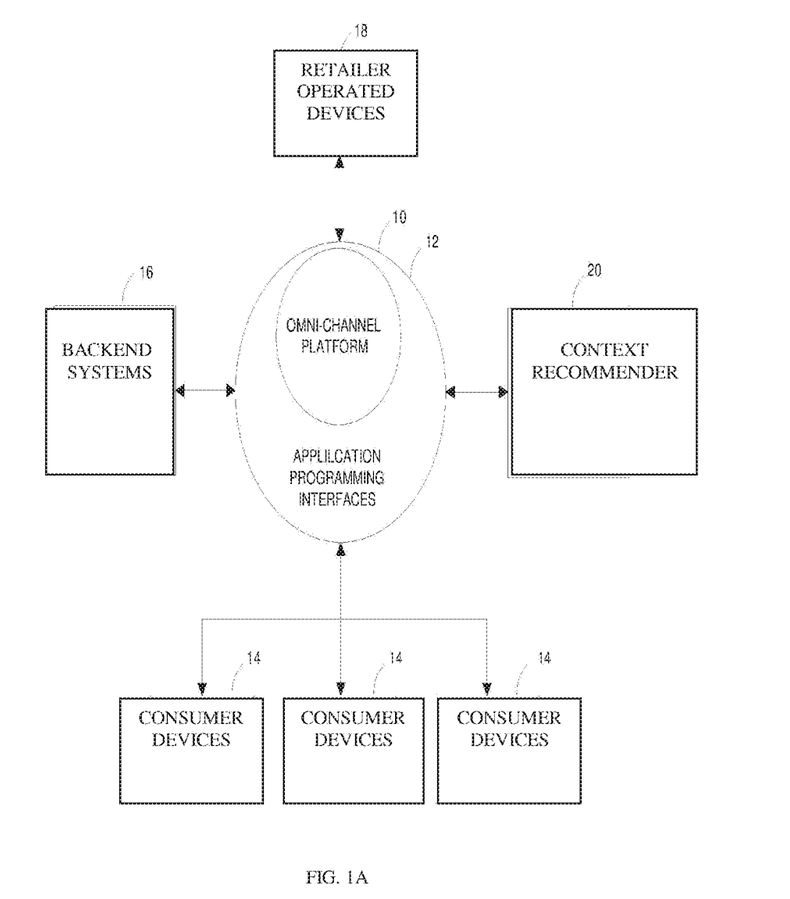
FIG. 1A is a diagram of a system for integration processing of real-time information, according to an example embodiment.

FIG. 1 is a diagram of a system for VR transaction integration, according to an example embodiment. The system is shown schematically in greatly simplified form, with only those components relevant to understanding of one or more embodiments (represented herein) being illustrated. The various components are illustrated and the arrangement of the components is presented for purposes of illustration only. It is to be noted that other arrangements with more or less components are possible without departing from the integration processing of real-time information techniques presented herein and below.

Moreover, various components are illustrated as one or more software modules, which reside in non-transitory storage and/or hardware memory as executable instructions that when executed by one or more hardware processors perform the processing discussed herein and below.

The techniques, methods, and systems presented herein and below for integration processing of real-time information can be implemented in all, or some combination of the components shown in different hardware computing devices having one or more hardware processors.

The system includes: an Omni-channel platform 10 have a plurality of Application Programming Interfaces (APIs), a plurality of consumer-operated devices 14, a plurality of backend systems 16, a real-time context recommender 20, and a plurality of Point-Of-Sale (POS) terminals associated with retailers.

The Omni-channel platform 10 provides communications between systems and applications connected to platform 10. In an example configuration, each system 16 connects to platform 10 through an API 12. The Omni-channel platform 10 may be a cloud-based system connected to a network, which may include a global communications network, also known as the Internet. The system includes computers with processors, memory, and program and data storage.

The APIs 12 through the platform 10 provide real-time communication of information to the context recommender 20. The channels can include a variety of types, such as but not limited to, social media, automated voice, web-based, SMS text, television, and others.

The backend systems 16 include a variety of information sources, some of which are published by retailers, some by non-profit organizations, some by government entities, and the like. The backend systems 16 include their own APIs from which information can be obtained from the backend systems 16 or from which a registration can be made to receive real-time dynamically pushed information (such as, but not limited to, RSS feds, and the like). For example, a backend system 16 could be a Twitter® site, a Facebook® site, a weather service site, a news service site, a currency exchange site, a retailer's site, and others.

The consumer devices 14 can include a variety of devices operated by the consumer, such as, a network-enabled voice device (Echo®, Google Home®, Siri®, etc.), a phone, a wearable processing device, a laptop, a smart television, a desktop, an in-vehicle device, a tablet, a processor and network-enabled appliance or device that is part of the Internet-of-Things (IoTs), and the like.

In an embodiment, a small interface or reporting application executes on the consumer devices 14. This interface or reporting application provides information through the APIs 12 to the Omni-channel platform 10 where it is collected by the context recommender 20. This reporting application can identify a physical location of the consumer device 14 as well as report on an activity that is taking place on the consumer device 14. For example, reporting that a specific sporting event is being watched on a consumer device 14.

The context recommender 20 uses the platform 10 and the APIs 12 to register and dynamically collect real-time information from the backend systems 16, which provide information (news, weather, sports, politics, government, product information, discounts on goods and services, historical information, etc.). The context recommender 20 also uses the platform 10 and the APIs 12 to receive real-time information about where the consumer is located and what the consumer is currently doing (based on the reporting application processing on the consumer devices 14 and based on what applications are being processed or what activity the consumer devices are processing as an indication of a current real-time context for the consumer).

In an embodiment, the context of the consumer is defined as an action or processing that is identified as being active on a consumer device 14 as well as a location of the consumer device 14 (available through location services of the consumer device 14 and reported through the reporting application).

The context recommender 20 uses the current reported context of the consumer with at least one other piece of information gathered from one or more of the backend systems 16 (through the APIs), where that other piece of information is not directly related, or in some cases is completely unrelated, to the consumer's context. For example, the consumer may be watching a sporting event from a known home location for the consumer and the context recommender 20 obtains the weather from a backend system 14 associated with providing weather. The current temperature at the consumer's home location is unrelated to the sporting event being watched on a smart television (consumer device 14). However, the context recommender knows through prior configuration with retailer data that soup is more likely to sell in cold weather. The temperature at the consumer's home location is 0 degrees Fahrenheit. This added unrelated information of weather when combined with the relationship known to the context recommender 20 and the consumer's current context of watching a sporting event at home allows the context recommender 20 to use the APIs to obtain an offer from a local restaurant for a free bowl of chicken noodle soup with the purchase of a drink. This can be presented to the consumer on the smart television or on the consumer's phone through a text message during the sporting event. It can be presented on the smart television by pushing the offer to an interface of the smart television to display the offer or it can be SMS texted to the consumer phone during the game.

In some cases, the context recommender 20 takes advantage of a real-time event occurring in the sporting event. For example, suppose the context recommender 20 is aware of the consumer watching a football game and as such is monitoring a Twitter® feed backend system 16 for scoring updates. Suppose that the team that is playing is a team in the city that the consumer is known to reside, which means a pretty fair assumption is that the consumer is a fan of the home football team. Now suppose that the home team scores a critical touchdown late in the game and through the API the context recommender 20 discovers a local bar is offering 6 free wings to the first 50 fans following a touchdown by the home team. As soon as the touchdown is detected, the context recommender 20 pushes the offer for acceptance to the consumer (through the television, phone, or audibly through Amazon Echo®). The consumer is able to accept the offer in near real time, so the consumer is one of the first 50 fans thanks to the quick reporting of the context recommender 20. The offer is accepted through APIs directly with a Retailer operated device 18 that provides a bar code or a Quick Response (OR) code pushed as a SMS to the consumer's phone. The consumer then scans the QR code at a same or different retailer operated device 18, such as a POS or SST, from the display of the phone and receives at the bar the 6 free wings.

It is noted that the retailer-operated device 18 can include a VR device, a POS terminal, a SST terminal, an ecommerce-enabled device, a network-voice enabled device, etc.

In an embodiment, the context recommender 20 processes at least one real-time piece of information that is directly relevant to a consumer's current real-world context or activity from at least one backend system 14 to make a recommendation to the consumer in real time for a discount, free gift, and the like.

In an embodiment, the context recommender 20 processes at least one real-time piece of information that is directly related to the consumer's context from a first backend system 14 and at least one real-time piece of information that is unrelated to the consumer's context from a second backend system 14 for making a real-time recommendation to the consumer for a discount, free gift, and the like.

In an embodiment, the real-time piece of information is unrelated to the consumer's current context when the context recommender 20 makes a real-time recommendation. For example, the weather may be calling for heavy snow and salt and shovels are in short supply. The context recommender 20 may recommend both at a discount and setup for delivery to the consumer within an hour while the consumer is watching the sporting event.

The context recommender 20 is configured with logic for creating marketing relationships between the consumer's current context and the dynamically obtained real-time information. That is, the context recommender 20 includes predefined thresholds based on what would trigger an intent to obtain a positive action from the consumer with respect to some available offer (gleaned from the backend systems 14).

Figure 1B:
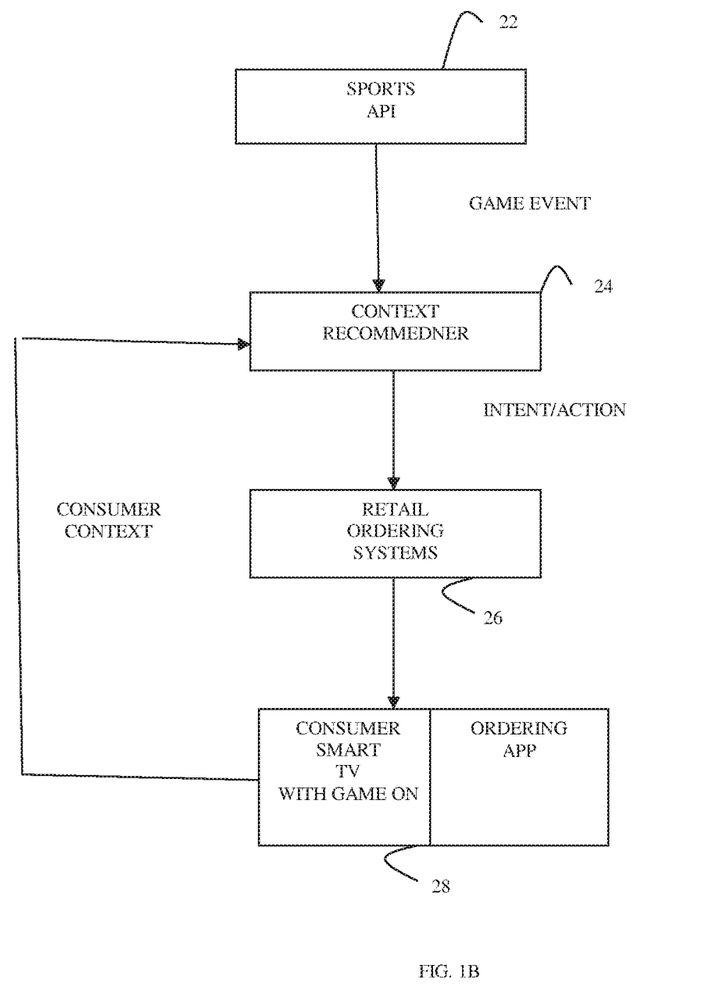
FIG. 1B is a diagram of a method for integration processing of real-time information, according to an example embodiment.

As another example, consider the method depicted in the FIG. 1B for integration processing of real-time information.

At 22, a sports API as one of the APIs 12 is activated based on a current context of the consumer who is wanting a sporting event. This allows for the detection of a real-time event for the sporting event (game) by the context recommender 20, at 24. The context recommender 20 sends a message to the smart television of the consumer and activates a retail ordering system for an offer, at 26. The retail ordering system is provided a session link for activating an ordering application interface on the consumer's smart television, at 28. In an embodiment, the context recommender 20 maintains with the consumer context, a session link to the device and game, which the context recommender 20 provides to a third-party retail ordering system for the retail ordering system to directly interface with the consumer during the game from the smart televisions through the ordering application interface.

The platform 10 combined with the APIs 12 permit the context recommender 20 to facilitate interaction between third-party applications and retailer operated devices 18. So, the consumer can use the consumer devices 14 for interaction with the context recommender 20, with the retailer operated devices 18, and with third-party applications/systems.

In an embodiment, the context recommender 20 crowdsources information in real time from a plurality of backend systems 14. In an embodiment, at least one backend system 14 includes a social media interface or feed.

In an embodiment, the context recommender 20 uses searching and Natural Language Processing (NLP) to interact with the backend systems 14 for obtaining the real-time information. This can be done for gather statistics in real time for a sporting game (game statistics) and the context recommender 20 then passes these statistics on to frontend clients (consumer devices 14).

As used herein, the terms "consumer," "customer," and "user" may be used interchangeably and synonymously.

As used herein, the interfaces through which the customer interacts with the retailer operated devices 18, the third-party application, and the context recommender 20 are referred to as client "touchpoints" available on the client-operated devices 14. The touchpoints can be text based, voice spoken, web based, smart-television based, processor-enabled wearable based, IoT based, video-gesture based, and the like.

The system permits real-time collection of information (some related and some unrelated) to be collected from a plurality of disparate backend systems and integrated offers and recommendations for offers to consumer touchpoints in real time.

These and other embodiments will now be discussed with reference to the FIGS. 2-4.

Figure 2:
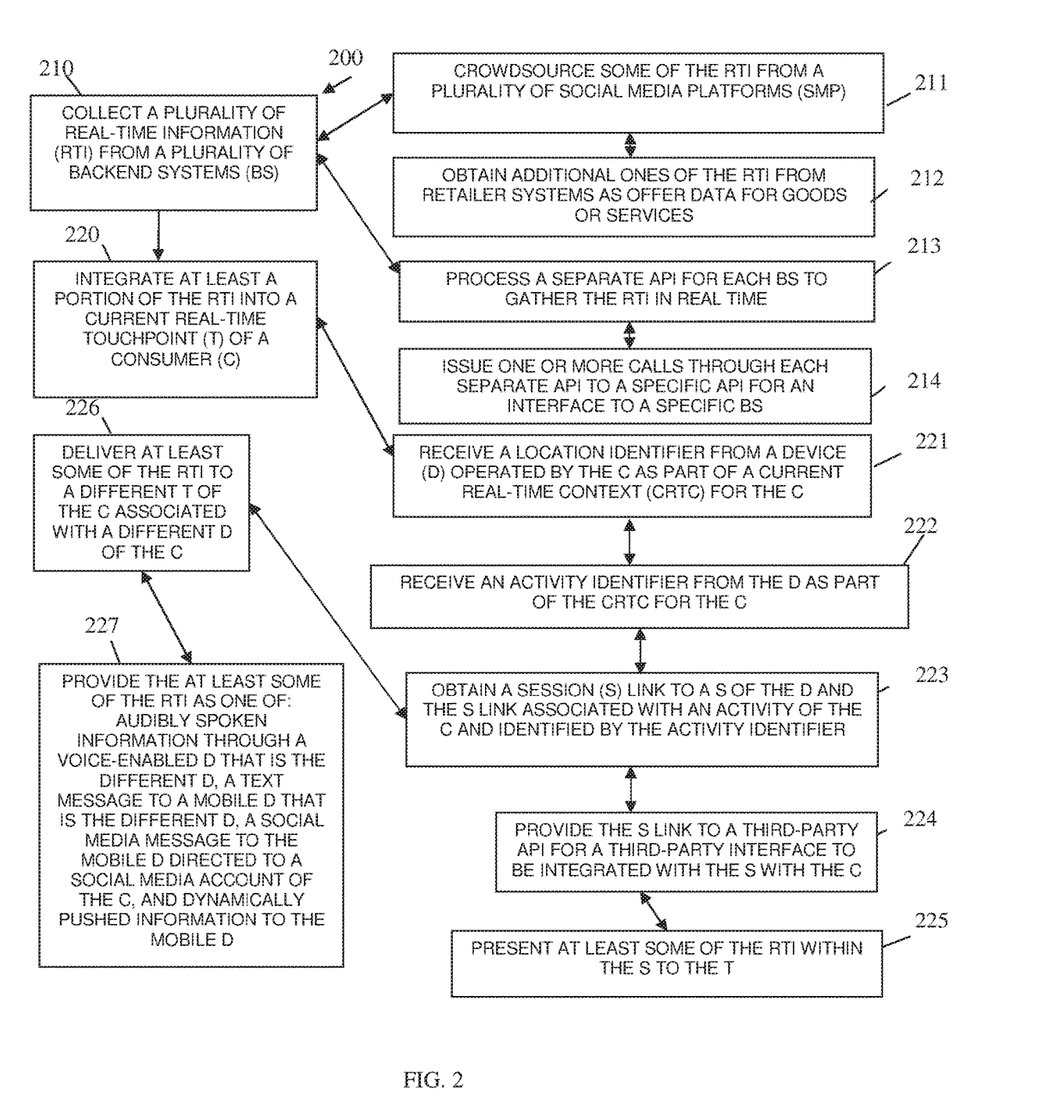
FIG. 2 is a diagram of another method for integration processing of real-time information, according to an example embodiment.

FIG. 2 is a diagram of another method 200 for integration processing of real-time information, according to an example embodiment. The software module(s) that implements the method 200 is referred to as a "context manager." The context manager is implemented as executable instructions programmed and residing within memory and/or a non-transitory computer-readable (processor-readable) storage medium and executed by one or more hardware processors of a hardware computing device. The processors of the device that executes the context manager are specifically configured and programmed to process the context manager. The context manager has access to one or more networks during its processing. The networks can be wired, wireless, or a combination of wired and wireless.

In an embodiment, the device that executes the context manager is a single device or set of devices that process in a cloud processing environment.

In an embodiment, the device that executes the context manager is a server.

In an embodiment, the context manager all or some combination of the platform 10, the APIs 12, and/or the context recommender 20.

At 210, the context manager collects a plurality of real-time information from a plurality of backend systems. In an embodiment, this is done over the platform 10 with the APIs 12.

According to an embodiment, at 211, the context manager crowdsources some of the real-time information from a plurality of social media platforms. This can be done by monitoring specific social media accounts, monitoring specific events being discussed on social media sites, monitoring trending topics on social media sites, and the like. This can also be done through specific social media APIs that permit the real-time information to be detected and retrieved. In an embodiment, the crowdsourcing is processed for two or more disparate social media sites.

In an embodiment of 211 and at 212, the context manager obtains additional ones of the real-time information from retailer systems as offer data for goods or services. In an embodiment, this is processed over platform 10 using the APIs 12. In an embodiment, at least one of the retailer systems is a retailer operated device 18. In an embodiment, at least one of the retail systems is a website accessible site that permits automated interaction through a retailer-specific API.

In an embodiment, at 213, the context manager processes a separate API for each backend system to gather the real-time information in real time.

In an embodiment of 213 and at 214, the context manager issues one or more calls to a specific API for an interface to a specific backend system.

At 220, the context manager integrates at least a portion of the real-time information into a current real-time touchpoint of a consumer. The touchpoint is an interface accessible on a device that the consumer is operating or has access to operate. In an embodiment, the touchpoint is processed on a Self-Service Terminal (SST) that the consumer operates with a retailer. In an embodiment, the device executing the touchpoint is any of the consumer devices 14 discussed above with the FIGS. 1A-1B.

According to an embodiment, at 221, the context manager receives a location identifier from a device operated by the consumer as part of a current real-time context for the consumer.

In an embodiment of 221 and at 222, the context manager receives an activity identifier from the device as part of the current real-time context. This can identify an activity being processed on the device, such as watching a specific event on a device (any of the devices 114 discussed above with the FIGS. 1A-1B).

In an embodiment of 222 and at 223, the context manager obtains a session link to a session of the device. The session link associated with an activity of the consumer or an application processing on the device and the activity identified by the activity identifier.

In an embodiment of 223 and at 224, the context manager provides the session link to a third-party interface to be integrated with the session of the consumer occurring on the device.

In an embodiment of 224 and at 225, the context manager presents at least some of the real-time information within the session to the current-real time touchpoint.

In an embodiment of 223 and at 226, the context manager deliver at least some of the real-time information to a different touchpoint of the consumer associated with a different device of the consumer.

In an embodiment of 226 and at 227, the context manager provides the at least some of the real-time information as one of: audibly (spoke) information through a voice-enabled device that is the different device (such as Echo®, Google Home®, Siri®, etc.), a Short Message Service (SMS) text message to a mobile device that is the different device, a social media message to the mobile device directed to a social media account of the consumer, and dynamically pushed information to the mobile device (and in some cases initiates a mobile application on the mobile device).

In an embodiment, the social media messages, the voice communication, and/or the text communication is provided through an automated chat bot.

In an embodiment, the integration processing 220 occurs with some real-time information that is unrelated to a current context of the consumer.

In an embodiment, the integration processing 220 occurs with some real-time information that is related to the current context of the consumer and with some real-time information that is unrelated to the current context.

Figure 3:
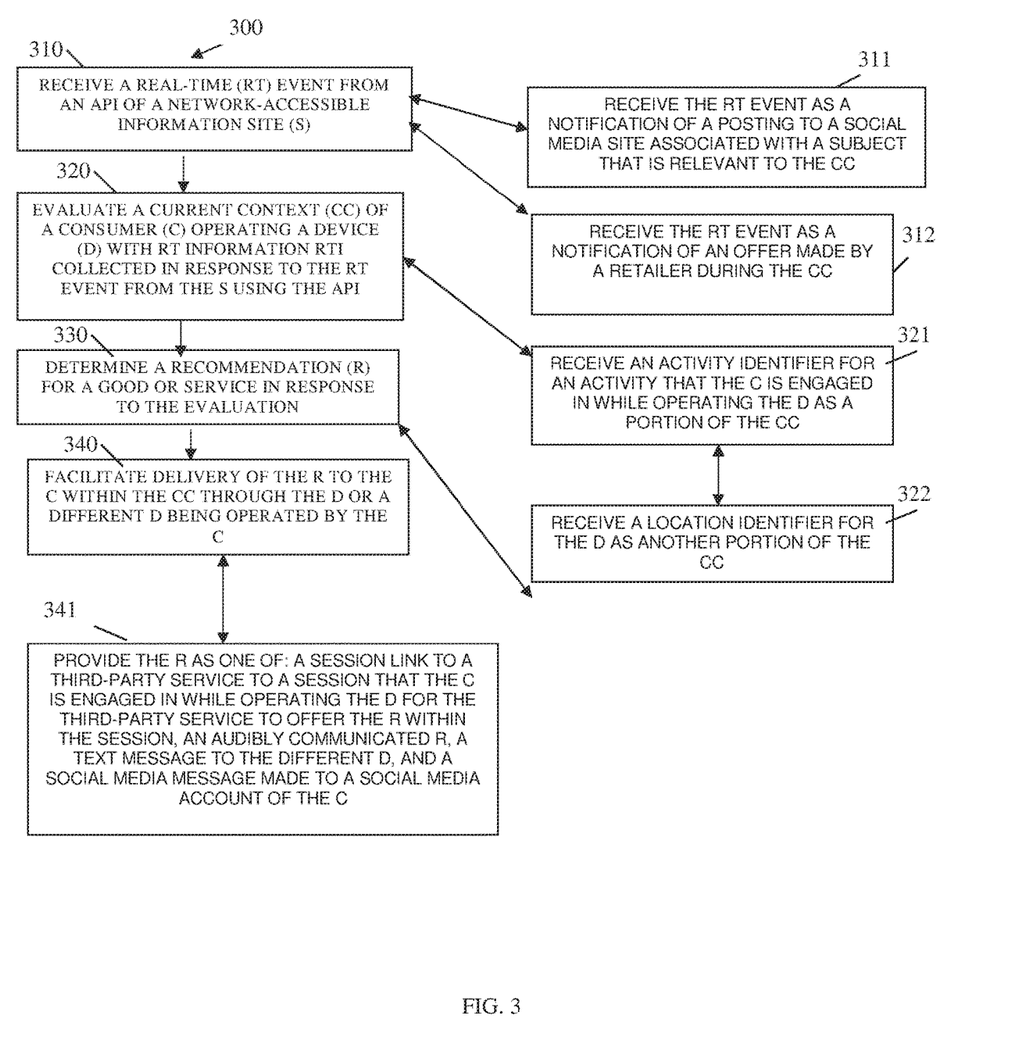
FIG. 3 is a diagram of still another method for integration processing of real-time information, according to an example embodiment.

FIG. 3 is a diagram of another method 300 for integration processing of real-time information, according to an example embodiment. The software module(s) that implements the method 300 is referred to as a "context recommendation manager." The context recommendation manager is implemented as executable instructions programmed and residing within memory and/or a non-transitory computer-readable (processor-readable) storage medium and executed by one or more hardware processors of a hardware device. The processors of the device that executes the context recommendation manager are specifically configured and programmed to process context recommendation manager.

The context recommendation manager has access to one or more networks during its processing. The networks can be wired, wireless, or a combination of wired and wireless.

In an embodiment, the device that executes the context recommendation manager is a single device or set of devices that process in a cloud processing environment.

In an embodiment, the device that executes the context recommendation manager is a server.

In an embodiment, the context recommendation manager is all or some combination of the platform 10, the APIs 12, the context recommender 20, and/or the method 200.

At 310, the context recommendation manager receives a real-time event from an API of a network-accessible information site. This can be translated and captured through the APIs 12 into a normalized format that the context recommendation manager can process.

In an embodiment, at 311, the context recommendation manager receives the real-time event as a notification of a posting to a social media site associated with a subject that is relevant to a current context of the consumer. The current context is what the consumer is presently engaged in as determined by devices operated by the consumer and as identified by the context recommendation manager. This can be achieved through searching social media feeds and using NLP. In an embodiment, the social media feed is a trending subject.

In an embodiment, at 312, the context recommendation manager receives the real-time event as a notification of an offer made by a retailer during the current context of the consumer.

At 320, the context recommendation manager evaluates a current context of a consumer operating a device with the real-time information. The real-time information initially collected at 310 in response to the current context of the consumer from the network-accessible information site using the API of the site.

According to an embodiment, at 321, the context recommendation manager receives an activity identifier for an activity that the consumer is engaged in while operating the device as a portion of the current context. For example, the consumer device may have a small reporting application that notifies the context recommendation manager when pre-defined applications are running, such as the consumer watching a real-time video program, the consumer engaging in a Virtual Reality (VR) buying experience, the consumer browsing an ecommerce site, the consumer browsing a news feed, and the like.

In an embodiment of 321 and at 322, the context recommendation manager receives a location identifier for the device as another portion of the current context for the consumer.

In the embodiments of 321 and 322, the consumer's current context is quantified by actions that the device that the consumer is operating reports and, in some cases, the location of that device. The consumer may have known locations registered or accessible from a profile of the consumer, such that the device location can be compared to those known locations. In an embodiment, the activity reported is an indicating that the consumer is exercising based on health data reported from a consumer-operated wearable device, such as a wrist band or watch.

At 330, the context recommendation manager determines a recommendation for a good or service in response to the evaluation processing at 320. That is, the context recommendation manager maps or associates the current context of the consumer with available offers known to the context recommendation manager. In an embodiment, pre-established relationships between activities of the consumer with specific goods or services are configured in the processing of the context recommendation manager. In an embodiment, the criteria processed by the context recommendation manager is provided through APIs 12 from retailers.

At 340, the context recommendation manager facilitates delivery of the recommendation to the consumer within the current context through the device being operated by the consumer or through a different device being operated by the consumer. Here, the context recommendation manager may directly engage the consumer with the recommendation on multiple devices of the consumer or may initiate third-party services or automated chat bots to engage the consumer with the recommendation.

For example, at 341, the context recommendation manager provides the recommendation as one of: a session link to a third-party service to a session that the consumer is engaged in while operating the device for the third-party service to offer the recommendation within that session, an audibly communicated recommendation that is serviced by an automated chat bot, a text message to a different device accessible to the consumer that is serviced by an automated chat bot, and a social media message made to a social media account of the consumer that is serviced by an automated chat bot.

Figure 4:
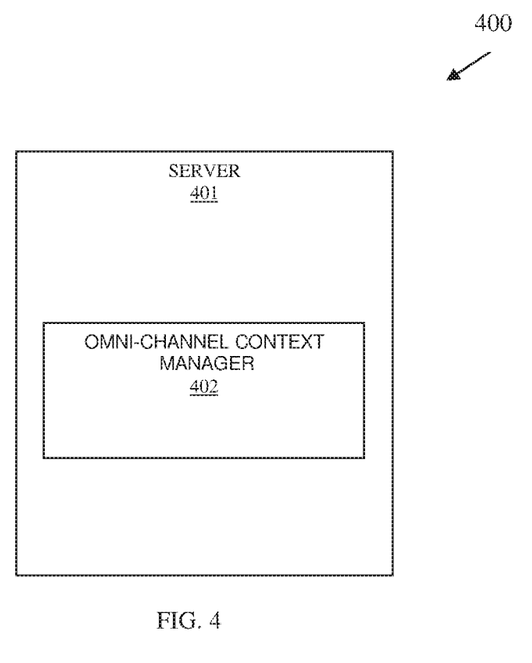
FIG. 4 is a diagram of another system for integration processing of real-time information, according to an example embodiment.

FIG. 4 is a diagram of another system 400 for integration processing of real-time information, according to an example embodiment. The system 400 includes a variety of hardware components and software components. The software components of the system 400 are programmed and reside within memory and/or a non-transitory computer-readable medium and execute on one or more hardware processors of a hardware device. The system 400 communicates one or more networks, which can be wired, wireless, or a combination of wired and wireless.

In an embodiment, the system 400 implements all or some combination of the processing discussed above with the FIGS. 1A-1B and 1-3.

In an embodiment, the system 400 implements, inter alia, the processing described above with the FIGS. 1A and 1B.

In an embodiment, the system 400 implements, inter alia, the method 200 of the FIG. 2.

In an embodiment, the system 400 implements, inter alia, the method 300 of the FIG. 3.

The system 400 includes a server 401 and the server including Omni-channel context manager 402.

The Omni-channel context manager 402 is configured to: 1) execute on one or more processors of the server 401 and 2) integrate real-time information into a current context of a consumer.

In an embodiment, the Omni-channel context manager 402 is further configured in 2) to crowdsource the real-time information from a plurality of social media sites.

In an embodiment, the Omni-channel context manager 402 is all or some combination of the processing discussed above in the FIGS. 1A-1B, the method 200, and/or the method 300.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
providing executable instructions from a non-transitory computer-readable storage medium to a hardware processor of a hardware server causing the hardware processor to perform operations comprising;
defining an Omni-channel platform that permits real-time interaction between a plurality of backend systems, retail-operated devices, and a plurality of consumer-operated devices;
establishing and maintaining connections of the backend systems, the retail-operated devices, and the consumer-operated devices to the Omni-channel platform;
collecting, dining the connections to the Omni-channel platform, a plurality of real-time information from the backend systems using a plurality of Application Programming Interfaces (APIs), wherein the plurality of real-time information is translated through the APIs into a normalized format;
associating, during the connections to the Omni-channel platform, a first portion of the plurality of normalized real-time information with a current location of a consumer and actions of the consumer at the current location based on reported information provided by applications processing on a plurality of consumer devices at the current location, wherein associating further includes identifying the first portion from the plurality of normalized real-time information that is collected from the backend systems and provided by the applications to the backend systems;
obtaining, during the connections to the Omni-channel platform, a second portion of the plurality of normalized real-time information that is provided by the backend systems but is not obtained by the backend system from the applications, wherein obtaining further includes obtaining the second portion as current weather at the current location, current sporting events, current news, and current product discount information;
creating, during the connections to the Omni-channel platform, a current context for the consumer based on the current location, the actions, and the second portion;

comparing, during the connections to the Omni-channel platform, the current context against predefined thresholds and identifying a third portion of normalized real time information from the current product discount information that reflects a likely intent of achieving a positive action from the consumer within the current context when the third portion is presented to the consumer within the current context; and
integrating, during the connections to the Omni-channel platform, the third portion of the plurality of normalized real-time information into a current real-time touchpoint interface accessible to the consumer on at least one of the consumer devices at the current location and during the current context.

2. The method of claim 1, wherein collecting further includes crowdsourcing some of the plurality of real-time information from a plurality of social media platforms.

3. The method of claim 2, wherein crowdsourcing further includes obtaining additional ones of the plurality of real-time information from retailer systems as offer data for goods or services.

4. The method of claim 1, wherein collecting further includes processing a separate API for each backend system to gather the plurality of real-time information in real time.

5. The method of claim 4, wherein processing further includes issuing one or more calls through each separate API to a specific API for an interface to a specific backend system.

6. The method of claim 1, wherein integrating further includes identifying a location identifier from a specific device operated by the consumer as part of the current context for the consumer.

7. The method of claim 6, wherein receiving further includes identifying an activity identifier from the specific device as part of the current context for the consumer.

8. The method of claim 7, wherein receiving further includes obtaining a session link to a session of the specific device and the session link associated with an activity of the consumer and identified by the activity identifier.

9. The method of claim 8, wherein obtaining further includes providing the session link to a third-party API for a third-party interface to be integrated with the session with the consumer.

10. The method of claim 8, wherein obtaining further includes presenting a fourth portion of the plurality of real-time information within the session to the current real-time touchpoint.

11. The method of claim 7, receiving further includes delivering a fourth portion of the plurality of real-time information to a different touchpoint interface operated by or accessible to the consumer, wherein the different touchpoint interface is associated with a different device of the consumer from the at least one of the consumer devices.

12. The method of claim 11, wherein delivering further includes providing the fourth portion as one of: audibly spoken information through a voice-enabled device that is the different device, a text message to a mobile device that is the different device, a social media message to the mobile device directed to a social media account of the consumer, and dynamically pushed information to the mobile device.

* * * * *